United States Patent
Cobb et al.

(10) Patent No.: US 8,270,733 B2
(45) Date of Patent: *Sep. 18, 2012

(54) IDENTIFYING ANOMALOUS OBJECT TYPES DURING CLASSIFICATION

(75) Inventors: Wesley Kenneth Cobb, The Woodlands, TX (US); David Friedlander, Houston, TX (US); Rajkiran Kumar Gottumukkal, Houston, TN (US); Ming-Jung Seow, Houston, TX (US); Gang Xu, Katy, TX (US)

(73) Assignee: Behavioral Recognition Systems, Inc., Houston, TX (US)

(*) Notice: Subject to any disclaimer, the term of this patent is extended or adjusted under 35 U.S.C. 154(b) by 465 days.

This patent is subject to a terminal disclaimer.

(21) Appl. No.: 12/551,276

(22) Filed: Aug. 31, 2009

(65) Prior Publication Data

US 2011/0052068 A1    Mar. 3, 2011

(51) Int. Cl.
*G06K 9/62* (2006.01)
*G01V 3/00* (2006.01)

(52) U.S. Cl. ............... 382/224; 382/103; 340/853.2

(58) Field of Classification Search ............. 382/100, 382/103, 106, 107, 155, 162, 168, 173, 181, 382/193, 199, 209, 218, 219, 224, 232, 254, 382/274, 276, 282, 286–294, 305, 312; 707/791; 340/573.1, 948, 853.2
See application file for complete search history.

(56) References Cited

U.S. PATENT DOCUMENTS

| | | | |
|---|---|---|---|
| 5,113,507 A | 5/1992 | Jaeckel | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1* | 12/2003 | Gordon et al. | 382/173 |
| 6,674,877 B1* | 1/2004 | Jojic et al. | 382/103 |
| 6,678,413 B1* | 1/2004 | Liang et al. | 382/181 |
| 6,856,249 B2* | 2/2005 | Strubbe et al. | 340/573.1 |

(Continued)

FOREIGN PATENT DOCUMENTS

WO      200949314 A2    4/2009

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), 2006, vol. 1: pp. 260-267.

(Continued)

*Primary Examiner* — Seyed Azarian
(74) *Attorney, Agent, or Firm* — Patterson & Sheridan, LLP

(57) ABSTRACT

Techniques are disclosed for identifying anomaly object types during classification of foreground objects extracted from image data. A self-organizing map and adaptive resonance theory (SOM-ART) network is used to discover object type clusters and classify objects depicted in the image data based on pixel-level micro-features that are extracted from the image data. Importantly, the discovery of the object type clusters is unsupervised, i.e., performed independent of any training data that defines particular objects, allowing a behavior-recognition system to forgo a training phase and for object classification to proceed without being constrained by specific object definitions. The SOM-ART network is adaptive and able to learn while discovering the object type clusters and classifying objects and identifying anomaly object types.

20 Claims, 9 Drawing Sheets

U.S. PATENT DOCUMENTS

| | | | |
|---|---|---|---|
| 6,940,998 B2 * | 9/2005 | Garoutte | 382/103 |
| 7,076,102 B2 * | 7/2006 | Lin et al. | 382/218 |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,606,425 B2 * | 10/2009 | Bazakos et al. | 382/224 |
| 7,825,954 B2 | 11/2010 | Zhang et al. | |
| 7,868,912 B2 | 1/2011 | Venetianer et al. | |
| 7,882,135 B2 * | 2/2011 | Brunner et al. | 707/791 |
| 2003/0107650 A1 | 6/2003 | Colmenarez et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |

OTHER PUBLICATIONS

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Elgammal et al. "Non-parametric Model for Background Substraction," Computer Vision Laboratory, University of Maryland; Jun. 2000; 17 pages, College Park, MD US.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

Apewokin et al. "Multimodal Mean Adaptive Backgrounding for Embedded Real-Time Video Surveillance," Jun. 2007, IEEE 6 pages. Minneapolis, MN US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Pentti Kanerva "Sparse Distributed memory and Related Models," M.H. Hassoun, ed., Associative Neural Memories: Theory and Implementation, 1993, pp. 50-76. New York: Oxford University Press.

* cited by examiner

IDENTIFYING ANOMALOUS OBJECT TYPES DURING CLASSIFICATION

BACKGROUND OF THE INVENTION

1. Field of the Invention

Embodiments of the invention provide techniques for classifying objects using pixel-level micro-features extracted from image data. More specifically, embodiments of the invention relate to techniques for identifying anomaly object types during classification.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine the type of object that the "blob" depicts.

However, such surveillance systems typically require that the objects which may be recognized by the system to be defined in advance. Thus, in practice, these systems rely on predefined definitions for objects to evaluate a video sequence. In other words, unless the underlying system includes a description for a particular object, i.e., has been trained, the system is generally incapable of recognizing that type of object. This results in surveillance systems with recognition capabilities that are labor intensive and prohibitively costly to maintain or adapt for different specialized applications. Accordingly, currently available video surveillance systems are often unable to identify objects, events, behaviors, or patterns as being "normal" or "abnormal' by observing what happens in the scene over time; instead, such systems rely on static object definitions.

Further, the static patterns recognized by available video surveillance systems are frequently either under inclusive (i.e., the pattern is too specific to recognize many instances of a given object) or over inclusive (i.e., the pattern is general enough to trigger many false positives). In some cases, the sensitivity of may be adjusted to help improve the recognition process, however, this approach fundamentally relies on the ability of the system to recognize predefined patterns for objects. As a result, by restricting the range of objects that a system may recognize using a predefined set of patterns, many available video surveillance systems have been of limited (on simply highly specialized) usefulness.

SUMMARY OF THE INVENTION

Embodiments of the invention relate to techniques for a micro-feature classifier component to discover object type clusters using pixel-level micro-features extracted from image data and identify anomaly object types. The object type clusters are discovered and updated by a self-organizing map and adaptive resonance theory (SOM-ART) network. The SOM-ART network is produced and updated based on the pixel-level micro-features independent of any object definition data, i.e., without training. Therefore, unsupervised learning, cluster discovery, and object type classification may be performed in parallel.

One embodiment of the invention includes a computer-implemented method for identifying anomaly object types during classification of image data captured by a video camera. The method may generally include receiving a micro-feature vector including multiple micro-feature values, where each micro-feature value based on at least one pixel-level characteristic of a foreground patch that depicts a foreground object within the image data. The method may also include classifying the foreground object as depicting a first object type corresponding to a first object type cluster of the object type clusters based on the micro-feature vector, computing a probability density function for the object type clusters, computing a probability density value for the micro-feature vector, and evaluating a rareness measure of the micro-feature vector. The rareness measure estimates a likelihood of observing the micro-feature vector, based on the probability density function and the probability density value. That is, the rareness measure provides a percentile ranking of just how atypical the micro-feature vector is, relative to previously observed micro feature vectors in the scene. The method may also include identifying the foreground object as an anomaly object type when the rareness measure is below a specified threshold.

Another embodiment of the invention includes a computer-readable storage medium containing a program which, when executed by a processor, performs an operation for identifying anomaly object types during classification of image data captured by a video camera. The operation may generally include receiving a micro-feature vector including multiple micro-feature values, where each micro-feature value based on at least one pixel-level characteristic of a foreground patch that depicts a foreground object within the image data and classifying the foreground object as depicting a first object type corresponding to a first object type cluster of the object type clusters based on the micro-feature vector. The operation may also include computing a probability density function for the object type clusters, computing a probability density value for the micro-feature vector, and evaluating a rareness measure of the micro-feature vector. The rareness measure estimates a likelihood of observing the micro-feature vector, based on the probability density function and the probability density value. The operation may also include identifying the foreground object as an anomaly object type when the rareness measure is below a specified threshold.

Still another embodiment includes a system having a video input source configured to provide image data. The system may also include a processor and a memory containing a program, which, when executed on the processor is configured to perform an operation for identifying anomaly object types during classification of image data captured by a video camera. The operation may generally include receiving a micro-feature vector including multiple micro-feature values, where each micro-feature value based on at least one pixel-level characteristic of a foreground patch that depicts a foreground object within the image data and classifying the foreground object as depicting a first object type corresponding to a first object type cluster of the object type clusters based on the micro-feature vector. The operation may also include computing a probability density function for the object type clusters, computing a probability density value for the micro-feature vector, and evaluating a rareness measure of the micro-feature vector. The rareness measure estimates a likelihood of observing the micro-feature vector, based on the probability density function and the probability density value. The operation may also include identifying the foreground object as an anomaly object type when the rareness measure is below a specified threshold.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
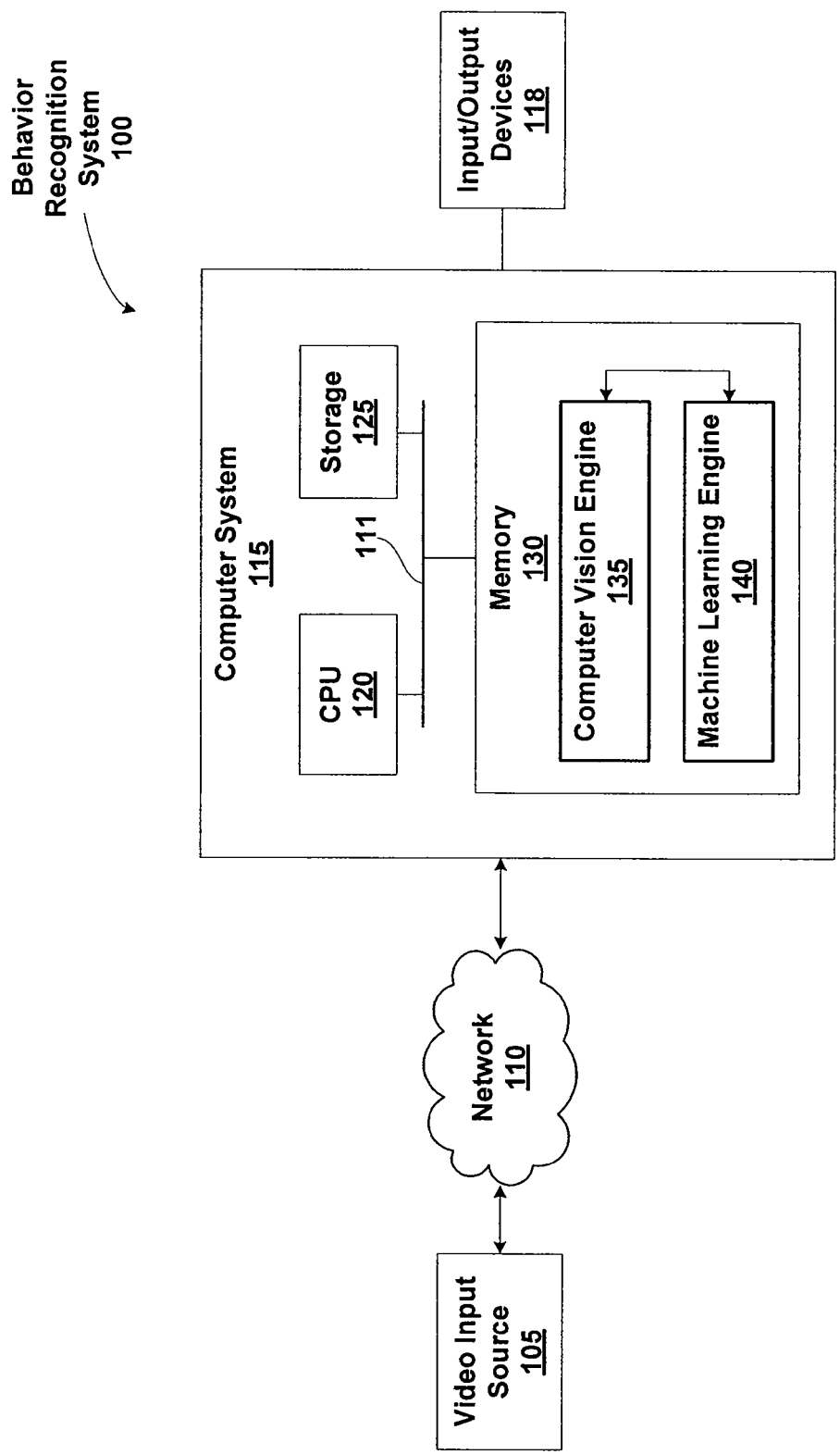
FIG. 1 illustrates components of a video analysis system, according to one embodiment of the invention.

Techniques are disclosed for identifying anomaly object types during classification of foreground objects extracted from image data. A self-organizing map and adaptive resonance theory (SOM-ART) network is used to discover object type clusters and classify objects depicted in the image data based on pixel-level micro-features that are extracted from the image data. The extracted micro-features are heuristic features of foreground patches depicting objects in frames of video. The extracted micro-features may be represented as a micro-feature vector input to the micro-feature classifier. The micro-feature classifier may learn a set of distinct object types, over time, through observing different micro-feature vectors. In one embodiment, a SOM-ART network is included within the micro-feature classifier to process the pixel-level micro-features to adaptively learn and organize the micro-features into object type clusters. The training of the SOM-ART network is unsupervised, i.e., performed independent of any training data that defines particular objects, allowing a behavior-recognition system to perform unsupervised learning and object classification in parallel without being constrained by specific object definitions.

The micro-feature extractor and micro-feature classifier may be included within a behavior-recognition system which may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to receive and evaluate a stream of video frames. Each frame may include data representing the color, grayscale, and/or intensity values for each pixel in the frame. A frame of video may be characterized using multiple color channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a group of pixels in the scene (referred to as a "blob" or "patch") is observed with appearance values that differ substantially from the background image, that region is identified as a foreground patch that likely depicts a foreground object. As described in greater detail below, pixel-level characteristics of the foreground patch are computed and used to extract pixel-level micro-features that are represented as a micro-feature vector. The micro-feature vector corresponding to the foreground patch may be evaluated to allow the system to distinguish among different types of foreground objects (e.g., a vehicle or a person) on the basis of the micro features. Further, the computer vision engine may identify features (e.g., height/width in pixels, color values, shape, area, pixel distributions, and the like) used to track the object from frame-to-frame. Further still, the computer vision engine may derive a variety of information while tracking the object from frame-to-frame, e.g., position, current (and projected) trajectory, direction, orientation, velocity, rigidity, acceleration, size, and the like. In one embodiment, the computer vision outputs this information and/or the micro-feature vector as a stream describing a collection of kinematic information related to each foreground patch in the video frames.

Data output from the computer vision engine may be supplied to the machine learning engine. In one embodiment, the machine learning engine may evaluate the context events to generate "primitive events" describing object behavior. Each primitive event may provide some semantic meaning to a group of one or more context events. For example, assume a camera records a car entering a scene, and that the car turns and parks in a parking spot. In such a case, the computer vision engine could initially recognize the car as a foreground object; classify it as being a vehicle (or least classify it as being an instance of an arbitrary object-type based on SOM-ART clusters of micro-feature vectors), and output kinematic data describing the position, movement, speed, etc., of the car in the context event stream. In turn, a primitive event detector could generate a stream of primitive events from the context event stream such as "vehicle appears," vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories representing a higher-level abstraction of a car parking in the scene—generated from the primitive events underlying the higher-level abstraction. Further still, patterns representing an event of interest may result in alerts passed to users of the behavioral recognition system.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

The computer vision engine 135 may be configured to analyze this raw information to identify foreground patches depicting active objects in the video stream, extract microfeatures, and derive a variety of metadata regarding the actions and interactions of such objects, and supply this information to a machine learning engine 140. In turn, the machine learning engine 140 may be configured to classify the objects, evaluate, observe, learn and remember details regarding events (and types of events) that transpire within the scene over time.

In one embodiment, the machine learning engine 140 receives the video frames and the data generated by the computer vision engine 135. The machine learning engine 140 may be configured to analyze the received data, classify objects, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI interface screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames, where N is greater than or equal to 1. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
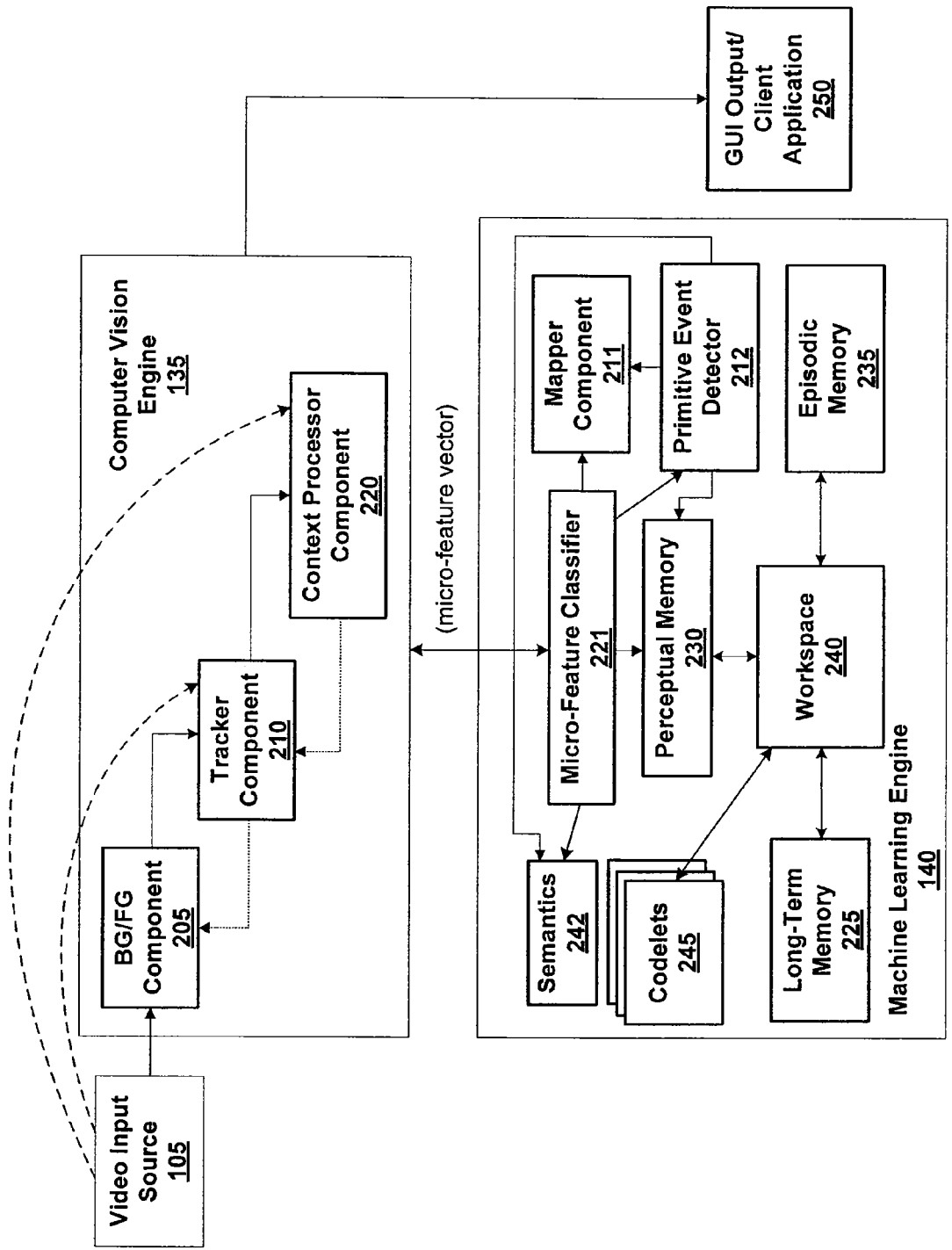
FIG. 2 further illustrates components of the video analysis system shown in FIG. 1, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a background/foreground (BG/FG) component 205, a tracker component 210, and a context processor component 220. Collectively, the components 205, 210, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, and 220 may each provide a software module configured to provide the functions described herein. Of course one of ordinary skill in the art will recognize that the components 205, 210, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground). The frame itself may include a two-dimensional array of pixel values for multiple channels (e.g., RGB channels for color video or grayscale channel or radiance channel for black and white video). The BG/FG component 205 may be configured to generate a mask used to identify which pixels of the scene have been determined to depict scene foreground and, conversely, which pixels have been determined to depict scene background. The BG/FG component 205 then identifies groups of pixels in the scene that contain a portion of scene foreground (referred to as a foreground "blob" or "patch") and supplies this information to subsequent stages of the pipeline. Additionally, portions of the scene determined to depict scene background may be used to update pixel values in a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The context processor component 220 may receive the output from other stages of the pipeline (i.e., the tracked objects and the background and foreground models). Using this information, the context processor 220 may be configured to generate a stream of micro-feature vectors corresponding to foreground patches tracked (by tracker component 210). For example, the context processor component 220 may evaluate a foreground patch from frame-to-frame and output micro-feature vectors including values representing the foreground patch's hue entropy, magnitude-saturation ratio, orientation angle, pixel area, aspect ratio, groupiness (based on the pixel-level spatial distribution), legged-ness (based on a number of potential legs), verticality (based on per-pixel gradients), motion vector orientation, rigidity/animateness, periodicity of motion, etc. Examples of Valid micro-feature values may range in value from 0 to 1 (inclusive) and −1 may be used to represent an invalid micro-feature value that should not be used for classification. Additionally, the context processor component 220 may output a stream of context events describing that foreground patch's height, width (in pixels), position (as a 2D coordinate in the scene), acceleration, velocity, orientation angle, etc. The computer vision engine 135 may take the outputs of the components 205, 210, and 220 describing the motions and actions of the tracked foreground patches in the scene and supply this information to the machine learning engine 140.

In some systems, the computer vision engine is configured to classify each tracked object as being one of a known category of objects using training data that defines a plurality of object types. For example, an estimator/identifier component may be included within the computer vision engine to classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object. Such an estimator/identifier component is provided with training data that specifies a plurality of objects and is used to perform the classification.

In contrast, systems that do not include an estimator/identifier component, such the computer vision engine 135 shown in FIG. 2, the classification of objects is performed by the micro-feature classifier 221 in the machine learning engine 140 using the micro-feature vectors that are produced by the computer vision engine 135 independent of any training data. By processing the foreground patches independent of training data, extraction and classification may begin earlier and can adapt to recognize a variety of different object types dependent on the specific image data. In particular, since the range of object types is not defined by training data, the range is also not restricted. When micro-features are used to classify, objects with similar micro-feature vectors are automatically grouped together in object type clusters. In some embodiments, the micro-feature classifier 221 may use a combination of a self-organizing map (SOM) adaptive resonance theory (ART) network to assign micro-feature vectors to clusters. In such a case, each cluster represents a distinct object type, without the distinct types having to be defined in advance. Additionally, in some embodiments the behavior recognition system 100 may be configured to present the foreground objects in a particular object type cluster to a user in order to allow the user to specify an object type label for the cluster.

In one embodiment, the primitive event detector 212 may be configured to receive the output of the computer vision engine 135 (i.e., the video images, the micro-feature vectors, and context event stream) and generate a sequence of primitive events—labeling the observed actions or behaviors in the video with semantic meaning. For example, assume the micro-feature classifier 221 has classified a foreground object as being a member of an object type cluster including vehicles based on the context event stream and/or micro-feature vectors received from the computer vision engine 135. The primitive event detector 212 may generate a semantic symbol stream that is output to the semantics component 242, providing a simple linguistic description of actions engaged in by the foreground object. For example, a sequence of primitive events related to observations of the computer vision engine 135 occurring at a parking lot could include language semantic vectors representing the following: "vehicle appears in scene," "vehicle moves to a given location," "vehicle stops moving," "person appears proximate to vehicle," "person moves," person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream and micro-feature vectors) and a primitive event stream generated by primitive event detector 212. The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time.

Generally, the workspace 240 provides a computational engine for the machine learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine learning engine 140 performs a cognitive cycle used to observe, and learn, about patterns of behavior that occur within the scene.

Figure 3A:
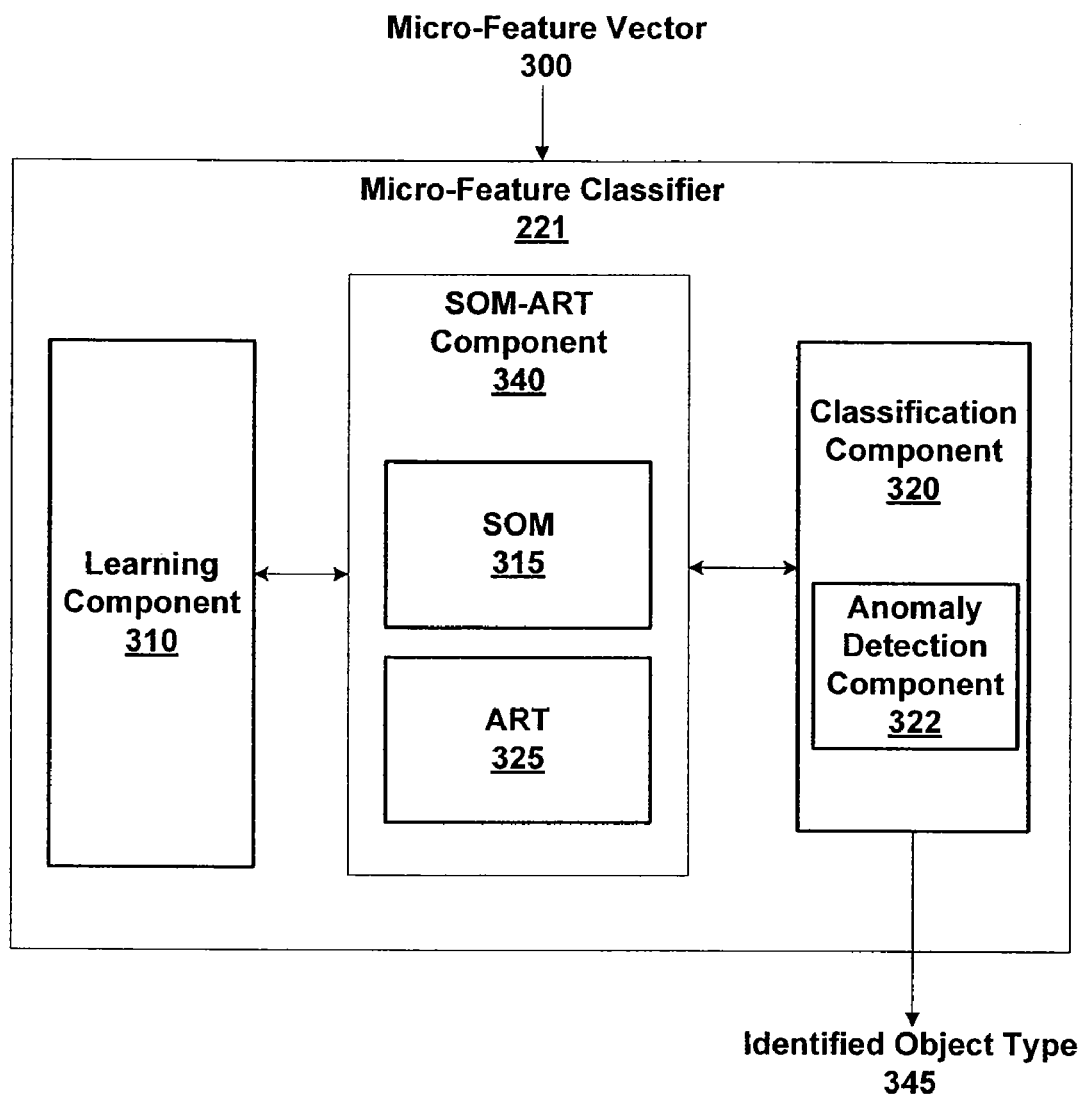
FIG. 3A illustrates an example of a micro-feature classifier component of the video analysis system shown in FIG. 2, according to one embodiment of the invention.

FIG. 3A illustrates an example of the micro-feature classifier component 221 of the video analysis system shown in FIG. 2, according to one embodiment of the invention. The micro-feature classifier component 221 receives a micro-feature vector 300 that is produced by the context processor component 220 and outputs an identified object type 345. The context processor component 220 processes the image data and produces pixel-level characteristic(s) that are used to generate the micro-feature vector 300. Micro-feature values are computed by the context processor component 220 and output as elements of the micro-feature vectors 300. Examples of micro-feature values include values representing the foreground patch's hue entropy, magnitude-saturation ratio, orientation angle, pixel area, aspect ratio, groupiness (based on the pixel-level spatial distribution), legged-ness, verticality (based on per-pixel gradients), animateness, periodicity of motion, etc. Valid micro-feature values may range in value from 0 to 1 (inclusive) and −1 may be used to represent an invalid micro-feature value that should not be used for classification. The micro-feature values may be represented in a floating point format.

The micro-feature classifier 221 includes a learning component 310, a SOM-ART network component 340, and a classification component 320. The SOM-ART network component 340 includes a SOM 315 and an ART 325. The SOM-ART network component 340 provides a specialized neural network configured to create object type clusters from a group of inputs, e.g., micro-feature vectors. Each element (micro-feature value) of the micro-feature vector is a dimension of an input to the SOM 315. The SOM 315 receives the N dimension micro-feature vector and produces a reduced dimension geometric representation of M dimensions, where M is less than or equal to N. Reducing the number of dimensions also reduces the time duration for self-training since the amount of input data needed to represent the distribution of the clusters is reduced. For example, when N is 6, the number of different input values is $8^6$=262,144 (assuming an 8 bit micro-feature value). Reducing the number of dimensions from 6 to 5, reduces the number of different input values from 262,144 to 32,768.

The ART 325 is updated by the learning component 310 to manage the object type clusters, creating new clusters, removing clusters, and merging clusters. The ART 325 is used by the classification component 320 to classify each foreground object depicted by a micro-feature vector as one of the learned object types or as an unrecognized (unknown) object type. The learning component 310 is not limited to specific pre-defined object types since the learning component 310 is configured to perform unsupervised learning to automatically find what and how many object types may exist in the image data. This unsupervised learning and object type cluster discovery are adaptive since the knowledge about existing classes of objects is dynamically updated as new object types appear and may occur in parallel with the classification functions performed by the classification component 320. Therefore, the micro-feature classifier 221 is suitable for real-time video surveillance applications. When the image data represents a new scene or at startup, the learning component 310 estimates the SOM 315 topology based on the number of input micro-feature vectors. A principal component analysis (PCA) technique may be used to initialize the SOM 315. The learning component 310 may process a first batch of micro-feature vectors to produce a mature SOM 315 before the classification component 325 processes any of the micro-feature vectors in the first batch. The size of the first and following batches may be adjusted to fit the incoming micro-feature data stream rate.

The learning component 310 may update the SOM-ART component 340 incrementally, i.e. as each micro-feature vector is received. Alternatively, the learning component 310 may collect a batch (predetermined number) of micro-feature vectors and update the SOM-ART component 340 periodically. The learning component 310 organizes the micro-feature vector elements in the SOM 315 neurons and then updates object type clusters in the ART neurons incrementally or periodically. The classification component 320 includes an anomaly detection component 322 and processes each micro-feature vector that is received by comparing the vector's micro-feature values with the existing object type clusters in the SOM-ART component 221. The anomaly detection component 322 is configured to compute a probability density function based on the existing clusters in the ART 325 and compute a probability density value for the micro-feature vector. The distance measure between the received micro-feature vector and the object type clusters in the SOM-ART (component 340) are used to characterize the accuracy of each cluster identified by the classification component 320 as a potential match. The object whence the micro-feature vector has been derived will be classified by the classification component 320 as either one of the learned object types or as an anomaly object type based on the probability density function and probability density value.

Figure 3B:
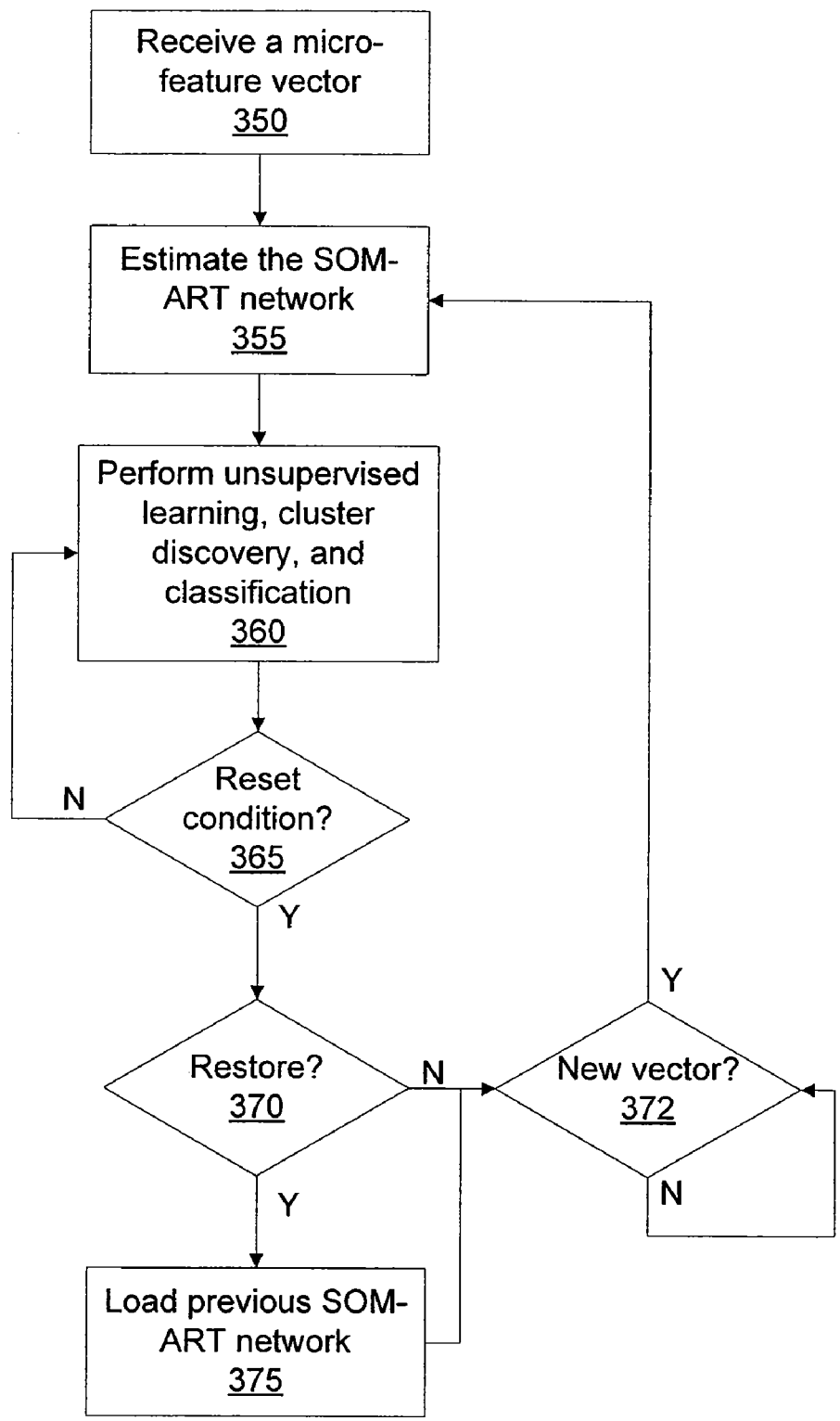
FIG. 3B illustrates a method for discovering object type clusters using pixel-level based micro-features, according to one embodiment of the invention.

FIG. 3B illustrates a method for discovering object type clusters using pixel-level based micro-features, according to one embodiment of the invention. The method begins at step 350 when a micro-feature vector is received by the micro-feature classifier 221. At step 355 the SOM-ART network is estimated by the SOM-ART network component 340 to produce an initial SOM 315. Once the SOM-ART network is estimated, the micro-feature vectors that were used to perform the estimation may be classified. At step 360 the micro-feature classifier 221 performs unsupervised learning, cluster discovery, and object type classification. The learning component 310 updates the SOM 315 and ART 325 periodically or incrementally.

At step 365 the machine learning engine 140 determines if a reset condition has occurred. A reset condition occurs when the scene being viewed changes dramatically or a new scene is viewed. Steps 360 and 365 are repeated until a reset condition does occur, and then at step 370 the machine learning engine 140 determines if information stored for a previously viewed scene may be restored to accelerate the learning process compared with initiating the learning process for a new scene. If, at step 370 the information stored for the previously viewed scene may be restored, then at step 375 the current SOM 315 and ART 325 information is stored and the information for the previously viewed scene is loaded into SOM 315 and ART 325 and the micro-feature classifier 221 proceeds to step 372.

When information stored for a previously viewed scene is not available to be restored at step 370, the machine learning engine 140 proceeds directly to step 372. At step 372 the micro-feature classifier 221 determines if a new micro-feature vector is received. When a new micro-feature vector is received in step 372, the micro-feature classifier 221 begins processing image data for the new or restored scene by returning to step 355. Otherwise, the micro-feature classifier 221 waits for a new micro-feature vector.

Figure 3C:
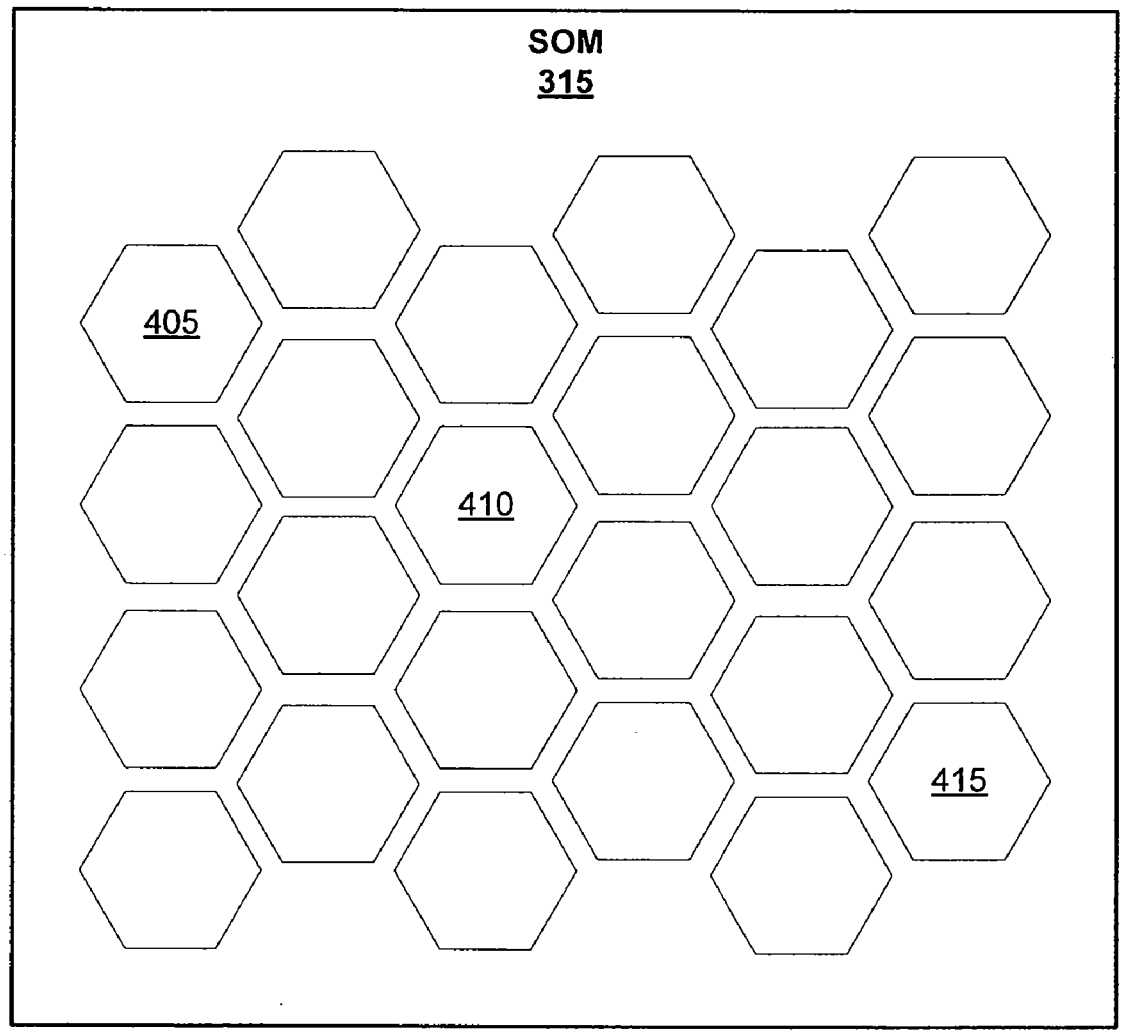
FIG. 3C illustrates a conceptual diagram of the SOM after the N dimension micro-feature vectors have been processed, according to one embodiment of the invention.

FIG. 3C illustrates a conceptual diagram of the SOM 315 after the N dimension micro-feature vectors have been processed, according to one embodiment of the invention. The SOM 315 converts the N dimensional micro-feature vectors that represent complex statistical relationships of the image data into simpler geometric relationships that may be represented in fewer (M) dimensions. The topological and metric relationships of the micro-feature vectors are preserved by the SOM 315 while the number of dimensions is reduced. The SOM 315 may include a two dimensional regular grid of nodes. Each node corresponds to a model that is computed based on the micro-feature vectors that are received. Neighboring models are similar and models that are a greater distance apart are dissimilar. In other words, the SOM 315 is a clustering diagram. The SOM 315 is computed using techniques known to those skilled in the art. In particular, the SOM 315 may be computed using a nonparametric, recursive regression process.

A node 405 may correspond to a micro-feature that is predominately shiny in terms of a pixel-level characteristic. Nodes near to the node 405 correspond to micro-features that are also shiny in addition to having other characteristics. A node 410 may correspond to a micro-feature that has a strong groupiness characteristic, perhaps indicative of a bicycle object type. A node 415 may correspond to a micro-feature that has a strong verticality characteristic, perhaps indicative of a person.

Each object type cluster itself may be characterized by a mean micro-feature vector and variances from a prototype input representing that cluster. The prototype is generated first, as a copy of the input vector used to create a new object type cluster. Subsequently, the prototype may be updated as new inputs are mapped to that object type cluster. Additionally, an object type cluster may be characterized by how many input vectors have been used to update that object type cluster—after it is initially created. Typically, the more input vectors that map to a given object type cluster, the more significant that object type cluster.

For example, the ART 325 may receive a micro-feature vector 300 as input and either update an existing cluster or create a new object type cluster, as determined using a choice test and a vigilance test for the ART 325. The choice and vigilance tests are used to evaluate the micro-feature vector 300 passed to the ART 325. The choice test provides a ranking of the existing object type clusters, relative to the micro-feature vector input data in the ART 325. Once ranked, the vigilance test evaluates the existing object type clusters to determine whether to map the foreground patch to a given object type cluster. If no object type cluster is found to update using the data supplied to the ART 325, evaluated sequentially using the ranked object type clusters, then a new object type cluster is created. That is, once a pattern is found (i.e., the input "matches" an existing cluster according to the choice and vigilance tests), the prototype for that object type cluster is updated based on the values of the input micro-feature vector 300. Otherwise, if the micro-feature vector 300 does not match any available object type cluster (using the vigilance test), a new object type cluster is created by storing a new pattern similar to the micro-feature vector 300. Subsequent micro-feature vectors that most closely resemble the new object type cluster (relative to the others) are then used to update that object type cluster.

As is known, the vigilance parameter has considerable influence on an ART 325: higher vigilance produces many, fine-grained clusters, while lower vigilance results in more-general clusters. Further, the inputs may be a binary values (generally referred to as an ART1 network), or may be continuous values (generally referred to as an ART2 network). Other variations of the ART 325 include ART3, ARTMAP, and FUZZY ART networks.

In one embodiment, the ART 325 may be configured to provide dynamic cluster sizes. For example, each cluster may be given an initial shape and size, such as a radius of 5-10.

Each new input to the ART 325 is then used to update the size of a cluster for each dimension of input data (or create a new cluster). Consider, e.g., a ART 325 which receives a micro-feature vector 300 that includes (x, y, h, w) representing a position (x, y) of an object in a frame of video (e.g., a foreground object classified as a person) having a height (h) and width (w) (in pixels). This example results in clusters in a 4 dimensional space—a hyper-ellipsoid. In such a case, clusters may be defined using a mean and variance for a cluster in each of the four dimensions. As new input micro-feature vectors 300 are mapped the cluster, the mean and variance for each dimension may be updated, changing the position, shape and size of the cluster. Alternatively, the clusters may be defined using a mean and a covariance. Doing so results in a more accurate boundary for each cluster. However, using a covariance approach increases the computational complexity. Thus, the actual approach may be tailored to suit the needs of a particular case. Further, by projecting the cluster into a two-dimensional plane (x, y), the resulting shape and position of the cluster correspond to a region in the scene where the events being categorized by the ART 325 have been observed. Thus, for an ART 325 that categorizes the position (and pixel width and height) of a person, each cluster identifies an area in the scene where people have, e.g., appeared, disappeared, or simply been observed to be present.

Additionally, in one embodiment, the ART 325 may also be configured to provide for cluster decay. For example, the ART 325 may be configured to require that a cluster be periodically reinforced in order to remain in the ART 325. In such a case, if a new cluster is created, but no new micro-feature vectors have been mapped to that cluster for a specified period, then the learning component 310 may remove the cluster from the ART 325. Doing so improves the efficiency of the ART 325 by not retaining clusters of little (or no) significance. Further, doing so helps to account for the reality that the events observed in a scene are expected to change over time. That is, while a cluster may be significant at one time (e.g., because people are repeatedly observed to appear at a first location), the patterns of behavior being observed may change (e.g., people being observed to appear at a second location).

As clusters emerge in the ART 325, the ART 325 may be evaluated to determine whether an unusual event has occurred, based on a set of alert rules. For example, consider the scenario when the ART 325 is configured to categorize objects of the "person" class, based on the position at which a person appears (or disappears) from the scene. In such a case, each cluster describes a prototypical position of where a person may appear—and a mean and variance from that prototypical position (e.g., to 2.5 standard deviations in the X and Y directions). In this scenario, an alert rule may specify that whenever the ART 325 generates a new cluster based on a set of parsed input values, an alert should be generated. Further, as the decision of the ART 325 to create a new cluster is dependent on whether a given input sufficiently resembles one of the current clusters, in one embodiment, the ART 325 is allowed to "mature" over specified period of time prior to any alerts being generated. That is, until the computer vision engine 135 has observed a sufficient number of persons, new clusters may be created with a relatively high frequency. Conversely, after prolonged observation, the relative frequency of new clusters should decline—making the event of a new cluster more unusual. Once the ART 325 has matured, objects with low computed accuracy values may be identified as anomaly object types and trigger an alert based on an alert rule. Of course, one of skill in the art that the alert rules may be based on a broad variety of triggering conditions based on the state of the ART 325—and that the actual alert rules may be tailored for the ART 325 and by the needs of a particular case.

As stated, clusters of the ART 325 may dynamically expand and contract by learning—as the mean and variance from the prototypical cluster value changes based on inputs to the ART 325. Further, multiple clusters may collapse to a single cluster when they overlap by a specified amount (e.g., the two clusters share greater than a specified percentage of their area). In such a case, the mean and variance of each cluster contributes to the mean and variance of the merged cluster. Additionally, the statistical significance of each cluster participating in the merger may contribute to a significance determined for the merged cluster. Also as stated, the micro-feature classifier 221 may track how many inputs to the ART 325 are mapped to a particular cluster in the ART 325. Typically, the more inputs that map to a cluster, the greater the relative significance of that cluster. In one embodiment, the relative importance of a given cluster may contribute to the determination of whether to generate an alert (according to the alert rules) when a new cluster is created (or otherwise). For example, if the ART 325 has many clusters, all of relatively equal significance, then the creation of a new cluster may be a relatively minor event. Conversely, if the ART 325 has a small number of clusters of disproportionate significance (relative to other clusters in the ART 325) then the creation of a new cluster may be a much more unusual event.

Figure 4A:
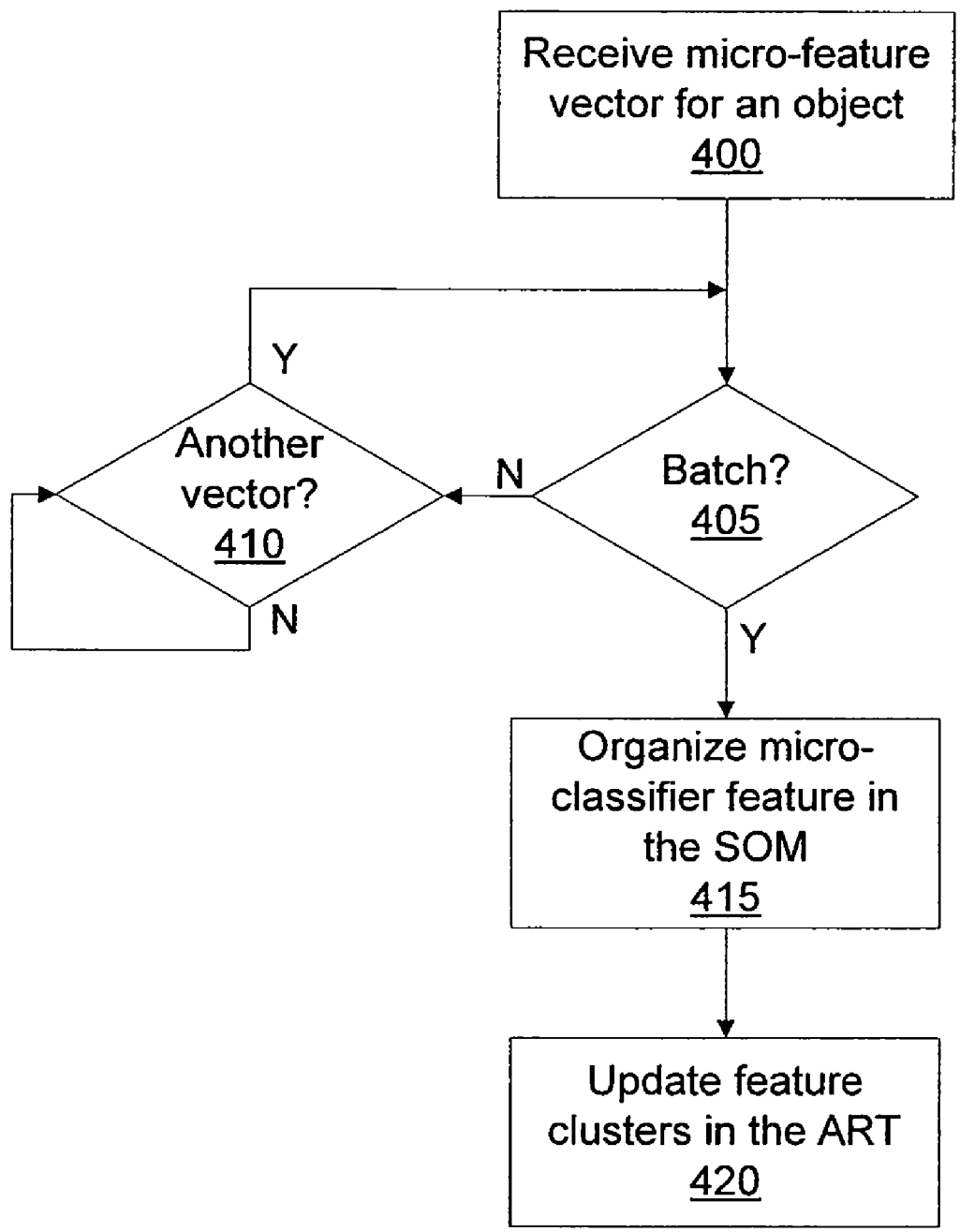
FIG. 4A illustrates a method for performing unsupervised learning using the SOM-ART network, according to one embodiment of the invention.

FIG. 4A illustrates a method for performing unsupervised learning using the SOM-ART network component 340, according to one embodiment of the invention. At step 400 a micro-feature vector for a foreground patch is received by the micro-feature classifier 221. At step 405 the learning component 310 determines if a batch of micro-feature vectors has been received, and, if not, then at step 410 the learning component 310 waits to receive another micro-feature vector before repeating step 405. If, at step 405 the learning component 310 determines that a batch of micro-feature vectors have been received, then at step 415 the learning component 310 organizes the micro-classifier feature in the SOM 315 based on the micro-feature vectors in the batch. At step 420 the learning component 310 updates the object type clusters in the SOM 315 and ART 325 based on the micro-feature vectors in the batch. Importantly, nodes in the SOM 315 are not updated with the invalid micro-feature vector values.

Figure 4B:
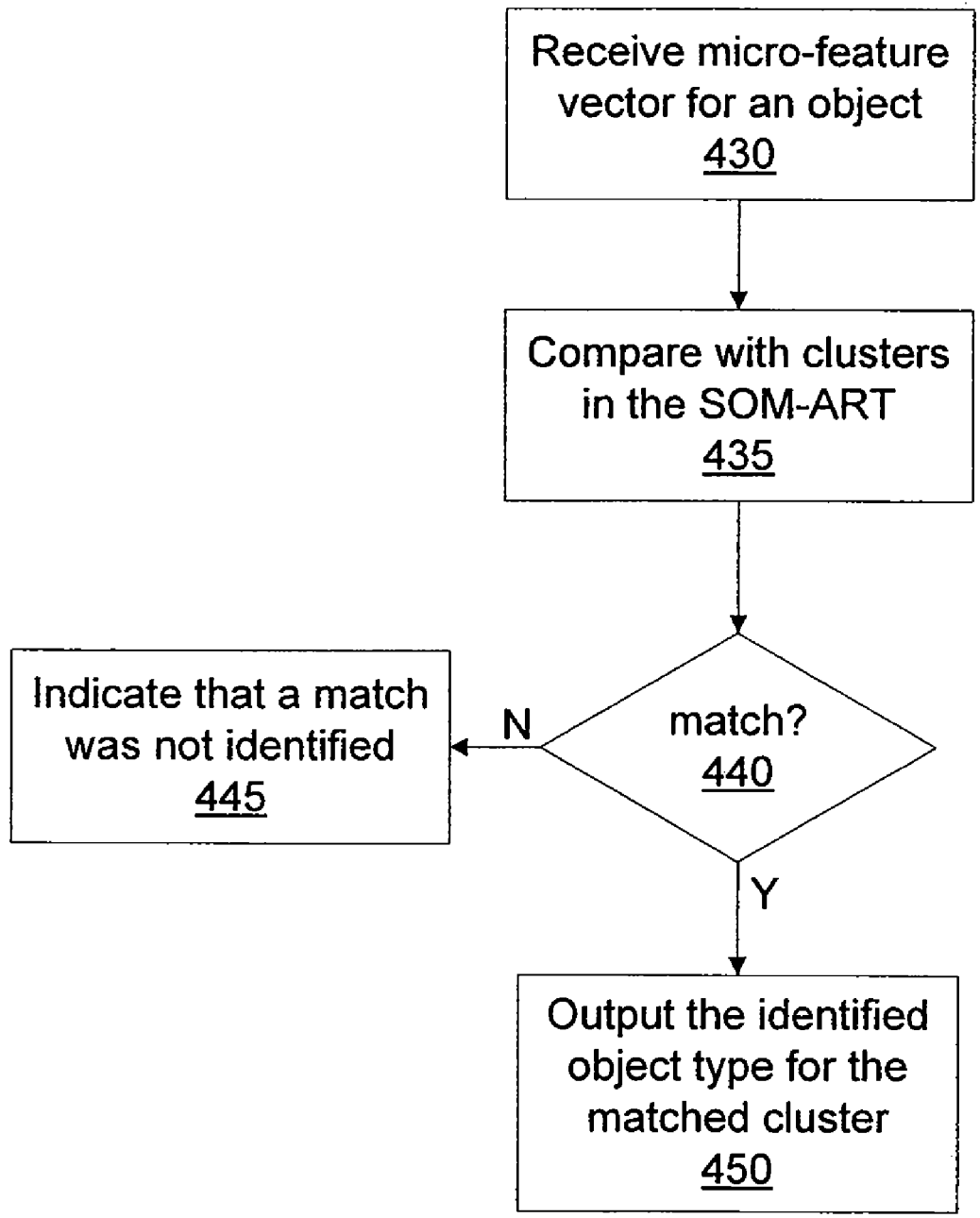
FIG. 4B illustrates a method for performing object type classification using the SOM-ART network, according to one embodiment of the invention.

FIG. 4B illustrates a method for performing object type classification using the SOM-ART network component 340, according to one embodiment of the invention. At step 430 a micro-feature vector for a foreground patch is received by the micro-feature classifier 221. At step 435 the classification component 320 compares the micro-feature vector with the object type clusters that have been discovered for the scene and represented by the SOM-ART component 340. At step 440 the classification component 320 determines if the micro-feature vector matches an object type cluster. If, in step 440 a match is found, then at step 450 the identified object type of the cluster is output for the matched micro-feature vector. If, at step 440 a match is not found, then at step 445 the classification component 320 indicates that a match was not identified for the micro-feature vector. When the anomaly detection component 322 is included in the classification component 320, the object type output for rare micro-feature vector that is unmatched, not accurately matched, or sometimes accurately matched micro-feature vector may be classified as the anomaly object type. An alternate method for performing object type classification using the anomaly detection component 322 is described in conjunction with FIG. 4D.

Figure 4C:
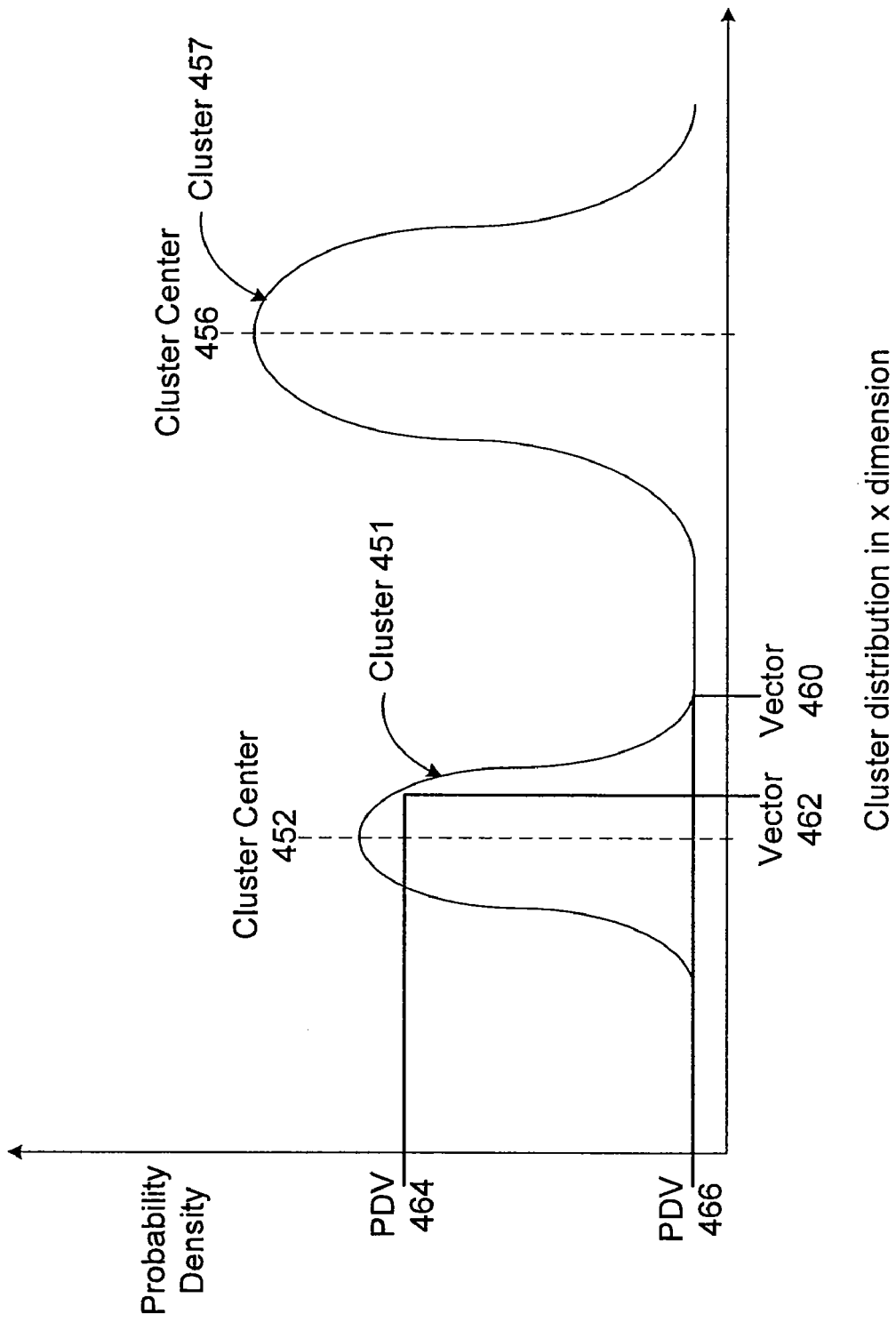
FIG. 4C illustrates a conceptual diagram of a probability density function for the object type clusters, according to one embodiment of the invention.

FIG. 4C illustrates a conceptual diagram of a probability density function for the object type clusters, according to one embodiment of the invention. The anomaly detection component 322 computes the probability density function for the object type clusters in the ART 325. The horizontal axis is the object type cluster distribution in the x dimension and the vertical axis is the probability density of the object type clusters. A first object type cluster 451 is positioned at cluster center 452 and a second object type cluster 457 is positioned at cluster center 456. The first object type cluster 451 may be identified by the classification component 320 as a match for a first micro-feature input vector 462 based on the position of the first micro-feature input vector 462 along the x axis. More specifically, the first object type cluster 451 is identified when the normalized Euclidean distance between the cluster center 452 and the position of the first micro-feature input vector 462 is less than a threshold value. Similarly, the first object type cluster 457 may also be identified by the classification component 320 as a match for a second micro-feature input vector 460 based on the position of the second micro-feature input vector 460 along the x axis.

The anomaly detection component 322 computes a probability density value 464 for the first micro-feature input vector 462. The probability density value 464 is very close to the probability density value for cluster 451, resulting in a high accuracy value that indicates the first object type cluster 451 is a match for the first micro-feature input vector 462. The anomaly detection component 322 also computes a probability density value 466 for the second micro-feature input vector 460. The probability density value 466 is not very close to the probability density value for cluster 451, resulting in a low accuracy value that indicates the first object type cluster 451 is not a match for the second micro-feature input vector 460.

Figure 4D:
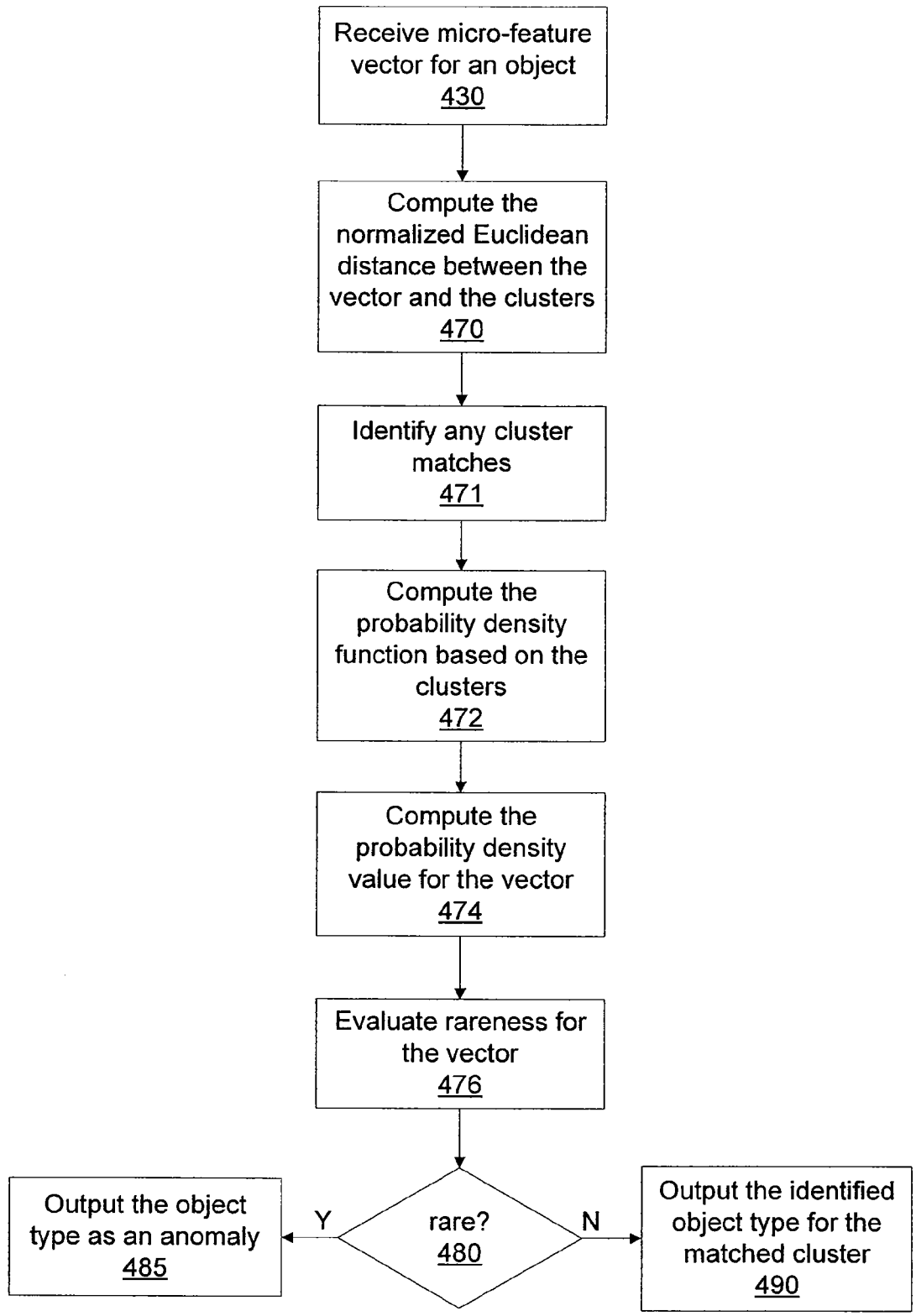
FIG. 4D illustrates another method for performing object type classification using the SOM-ART network, according to one embodiment of the invention.

FIG. 4D illustrates another method for performing object type classification using the SOM-ART network 340, according to one embodiment of the invention. At step 430 a micro-feature vector for a foreground patch is received by the classification component 320. At step 470 the classification component 320 computes the normalized Euclidean distance between the micro-feature vector and the object type clusters that have been discovered for the scene and represented by the SOM-ART component 340. At step 471 the classification component 320 identifies any object type clusters that match the micro-feature vector. At step 472 the anomaly detection component 322 computes the probability density function based on the object type clusters that have been discovered for the scene and represented by the SOM-ART component 340. At step 474 the computes a probability density value for the micro-feature vector. At step 476 the anomaly detection component 322 determines a rareness measure for the micro-feature vector. That is, the anomaly detection component 322 estimates a measure of the likelihood of observing the particular micro-feature vector, based on the probability density function and the probability micro-feature vector. In other words, the rareness measure may be used to estimate a percentile ranking of just how atypical the micro-feature vector is, relative to previously observed micro feature vectors in the scene.

At step 480 the classification component 320 determines if the micro-feature vector is rare or not for the foreground object represented by the micro-feature vector. If, in step 480 the micro-feature vector is not rare, then at step 490 the identified object type of the cluster is output for the matched micro-feature vector. If, at step 480 the micro-feature vector is found to be rare, then at step 485 the classification component 320 indicates that the anomaly object type was identified for the micro-feature vector. A threshold value may be used to determine if the micro-feature vector is rare or not.

Advantageously, embodiments of the invention may be used as part of a computer vision engine to identify unusual events as they are observed to occur in a sequence of video frames. Importantly, what is determined as unusual need not be defined in advance, but can be determined over time by observing a stream of primitive events and a stream of context events. The SOM-ART network may generate object type clusters from the set of micro-feature vectors that are supplied to the SOM-ART network. Each cluster represents an observed statistical distribution of a particular thing or event being observed in the SOM-ART network. Importantly, the computer vision engine requires no training using predefined object definitions in order to perform the cluster discovery and object type classification. The SOM-ART network is adaptive and able to learn by discovering the object type clusters and classifying objects in parallel.

While the foregoing is directed to embodiments of the present invention, other and further embodiments of the invention may be devised without departing from the basic scope thereof, and the scope thereof is determined by the claims that follow.

What is claimed is:

1. A computer-implemented method for identifying anomaly object types during classification of image data captured by a video camera, the method comprising:
   receiving a micro-feature vector including multiple micro-feature values, each micro-feature value based on at least one pixel-level characteristic of a foreground patch that depicts a foreground object within the image data;
   classifying the foreground object as depicting a first object type corresponding to a first object type cluster of the object type clusters based on the micro-feature vector;
   computing a probability density function for the object type clusters;
   computing a probability density value for the micro-feature vector;
   evaluating a rareness measure of the micro-feature vector, wherein the rareness measure estimates a likelihood of observing the micro-feature vector, based on the probability density function and the probability density value; and
   identifying the foreground object as an anomaly object type when the rareness measure is below a specified threshold.

2. The computer-implemented method of claim 1, wherein the foreground object is identified as the anomaly object type when the rareness measure is greater than a threshold value.

3. The computer-implemented method of claim 1, wherein the foreground object is classified as depicting the first object type when a distance between the micro-feature vector and a center of the first object type cluster is less than a threshold value.

4. The computer-implemented method of claim 1, further comprising processing the micro-feature vector by a self-organizing map adaptive resonance theory (SOM-ART) network to discover the object type clusters for the image data.

5. The computer-implemented method of claim 1, further comprising merging the first object type cluster with a second object type cluster of the object type clusters for the image data when the first object type cluster overlaps the second object type cluster by a specified amount.

6. The computer-implemented method of claim 1, further comprising:
   receiving additional micro-feature vectors; and
   removing the first object type cluster when none of the additional micro-feature vectors match the first object type cluster.

7. The computer-implemented method of claim 1, further comprising adding a new object type cluster when the micro-feature vector does not correspond to any of the object type clusters for the image data.

8. The computer-implemented method of claim 1, further comprising:
receiving additional micro-feature vectors; and
classifying additional foreground objects based on the additional micro-feature vectors before evaluating the rareness measure of the micro-feature vector.

9. A computer-readable storage medium containing a program which, when executed by a processor, performs an operation for identifying anomaly object types during classification of image data captured by a video camera, the operation comprising:
receiving a micro-feature vector including multiple micro-feature values, each micro-feature value based on at least one pixel-level characteristic of a foreground patch that depicts a foreground object within the image data;
classifying the foreground object as depicting a first object type corresponding to a first object type cluster of the object type clusters based on the micro-feature vector;
computing a probability density function for the object type clusters;
computing a probability density value for the micro-feature vector;
evaluating a rareness measure of the micro-feature vector, wherein the rareness measure estimates a likelihood of observing the micro-feature vector, based on the probability density function and the probability density value; and
identifying the foreground object as an anomaly object type when the rareness measure is below a specified threshold.

10. The computer-readable storage medium of claim 9, wherein the foreground object is identified as the anomaly object type when the rareness measure is greater than a threshold value.

11. The computer-readable storage medium of claim 9, wherein the foreground object is classified as depicting the first object type when a distance between the micro-feature vector and a center of the first object type cluster is less than a threshold value.

12. The computer-readable storage medium of claim 9, further comprising processing the micro-feature vector by a self-organizing map adaptive resonance theory (SOM-ART) network to discover the object type clusters for the image data.

13. The computer-readable storage medium of claim 9, further comprising:
receiving additional micro-feature vectors; and
classifying additional foreground objects based on the additional micro-feature vectors before evaluating the rareness measure of the micro-feature vector.

14. A system, comprising:
a video input source configured to provide image data;
a processor; and
a memory containing a program, which, when executed on the processor is configured to perform an operation that identifies anomaly object types during classification of image data captured by a video camera, the operation comprising:
receiving a micro-feature vector including multiple micro-feature values, each micro-feature value based on at least one pixel-level characteristic of a foreground patch that depicts a foreground object within the image data;
classifying the foreground object as depicting a first object type corresponding to a first object type cluster of the object type clusters based on the micro-feature vector;
computing a probability density function for the object type clusters;
computing a probability density value for the micro-feature vector;
evaluating a rareness measure of the micro-feature vector, wherein the rareness measure estimates a likelihood of observing the micro-feature vector, based on the probability density function and the probability density value, and
identifying the foreground object as an anomaly object type when the rareness measure is below a specified threshold.

15. The system of claim 14, wherein the foreground object is identified as the anomaly object type when the rareness measure is greater than a threshold value.

16. The system of claim 14, wherein the foreground object is classified as depicting the first object type when a distance between the micro-feature vector and a center of the first object type cluster is less than a threshold value.

17. The system of claim 14, further comprising processing the micro-feature vector by a self-organizing map adaptive resonance theory (SOM-ART) network to discover the object type clusters for the image data.

18. The system of claim 14, further comprising merging the first object type cluster with a second object type cluster of the object type clusters for the image data when the first object type cluster overlaps the second object type cluster by a specified amount.

19. The system of claim 14, further comprising:
receiving additional micro-feature vectors; and
removing the first object type cluster when none of the additional micro-feature vectors match the first object type cluster.

20. The system of claim 14, further comprising adding a new object type cluster when the micro-feature vector does not correspond to any of the object type clusters for the image data.

* * * * *